Feb. 17, 1959 E. C. HARTWIG ET AL 2,874,235

ULTRA-STABILIZED D. C. AMPLIFIER

Filed Sept. 28, 1955 2 Sheets-Sheet 1

INVENTORS.
EDWARD C. HARTWIG
ROBERT W. KUENNING
BY ROBERT C. ACKER

Roland A. Anderson
ATTORNEY.

ULTRA-STABILIZED D. C. AMPLIFIER

Filed Sept. 28, 1955 2 Sheets-Sheet 2

INVENTORS.
EDWARD C. HARTWIG
ROBERT W. KUENNING
BY ROBERT C. ACKER
Roland A. Anderson
ATTORNEY United States Patent Office 2,874,235

Patented Feb. 17, 1959

2,874,235

ULTRA-STABILIZED D. C. AMPLIFIER

Edward C. Hartwig, Walnut Creek, Robert W. Kuenning, Livermore, and Robert C. Acker, Berkeley, Calif., assignors to the United States of America as represented by the United States Atomic Energy Commission Application September 28, 1955, Serial No. 537,306

3 Claims. (Cl. 179—171)

The present invention relates to direct current amplifiers and, more particularly, to an improved circuit for stabilizing the drift and minimizing the noise and hum level of such amplifiers so that the output voltage will be zero when the input voltage is zero.

Numerous types of circuit arrangements for automatically stabilizing the gain and drift of direct current amplifiers are well known. Several of such circuit arrangements have, for certain applications, effectively utilized overall feedback in conjunction with a compensatory bias to provide a voltage proportional to the drift inherently introduced between the input and output terminals of a direct current amplifier which develops an opposed bias in the amplifier such that the drift is balanced out. In general, overall feedback between the input and output terminals of direct current amplifiers is utilized to stabilize the gain and to develop an error voltage proportional to drift introduced in the amplifiers. Such error voltage is then chopped by a contactor type of modulator such that it may be amplified in an alternating current amplifier, the output signal of which is rectified and applied to a biasing means at the input stage of the direct current amplifier. The bias so developed is of equal magnitude and opposite polarity to the drift voltage and the drift is compensated.

Heretofore, the modulator, alternating current amplifier and rectifier of the above-described type of feedback stabilized direct current amplifier have generally comprised a half-wave system; i. e., a system responsive to impulses of only one polarity. Since a half-wave system is effectively operative only during a half-cycle time of the modulator period, the rectified output voltage wave inherently contains a relatively large uncompensated noise and hum content originating both because of and during the intervening half cycle. A relatively large amount of filtering must then be utilized to reduce such noise and hum to a suitable level so that an extraneous signal is not introduced to the direct current amplifier. The amount of filtering, however, varies directly with the drift stabilization time of the direct current amplifier. Therefore, when the drift contains a substantial variation, such as low frequency flutter due to the inherent characteristics of vacuum tube cathodes, the rectified drift correction signal output from a half-wave system as applied to the compensatory biasing means within the direct current amplifier may lag the cause of such variation by a substantial time increment and cause inexact compensation of drift. A half-wave modulator, alternating current amplifier and rectifier system is then disadvantageous in a feedback stabilized direct current amplifier because of the noise and hum associated with such systems resulting in a slow drift stabilization time, inexact compensation of drift, and consequently a relatively low direct current amplifier fidelity.

The present invention overcomes the above-described disadvantages by providing a direct current amplifier having a full-wave stabilization system. Such a system is responsive to impulses of both positive and negative polarities and is thus active substantially all of the time to provide a rectified output voltage wave having a smaller noise and hum content than previously possible. With such a full-wave stabilization system the switching time of the contactor type of modulator is minimized. Consequently, only a small amount of filtering is required to reduce noise and hum in the drift correction voltage wave because of such switching time to such a level that extraneous signals introduced to the direct current amplifier are negligible. Since the required amount of filtering is small, the drift stabilization time of the system is also small and the drift correction voltage is applied to the direct current amplifier at very nearly the instant that the corresponding drift variation is introduced within such amplifier. Consequently, the present invention is an ultra-stabilized direct current amplifier wherein drift is effectively balanced out and extraneous noise and hum is negligible such that a very high fidelity output signal is obtained.

Variously, the device of the present invention is useful for the amplification of direct current signals with a very high degree of fidelity. It is especially useful for many applications where it is essential that the D. C. amplifier utilized to amplify very small signals does not introduce appreciable error thereto; e. g., as a servo amplifier, a device for amplifying correction signals in current regulators, an input amplifier to various D. C. measuring instruments, and the like.

It is therefore an object of the present invention to provide a high fidelity direct current amplifier.

Another object of the invention is to provide an improved direct current amplification device wherein drift is effectively eliminated.

Still another object of the invention is to provide an improved direct current amplification device having a very fast drift stabilization response.

An important object of the invention is to provide an improved feedback stabilized direct current amplification device having a minimum of inherent hum and noise.

Still another object of the present invention is to provide an improved device for sampling the drift voltage of a direct current amplifier as applied to an alternating current amplifier and for phasing the output of the latter amplifier to oppose the drift voltage while simultaneously introducing a negligible amount of noise and hum.

A further object of the present invention is to provide a direct current amplification device having a full-wave drift stabilizing feedback loop wherein a minimum of filtering is required.

The invention, both as to its organization and method of operation, together with further objects and advantages thereof, will best be understood by reference to the following specification taken in conjunction with the accompanying drawing, of which:

Figure 1:
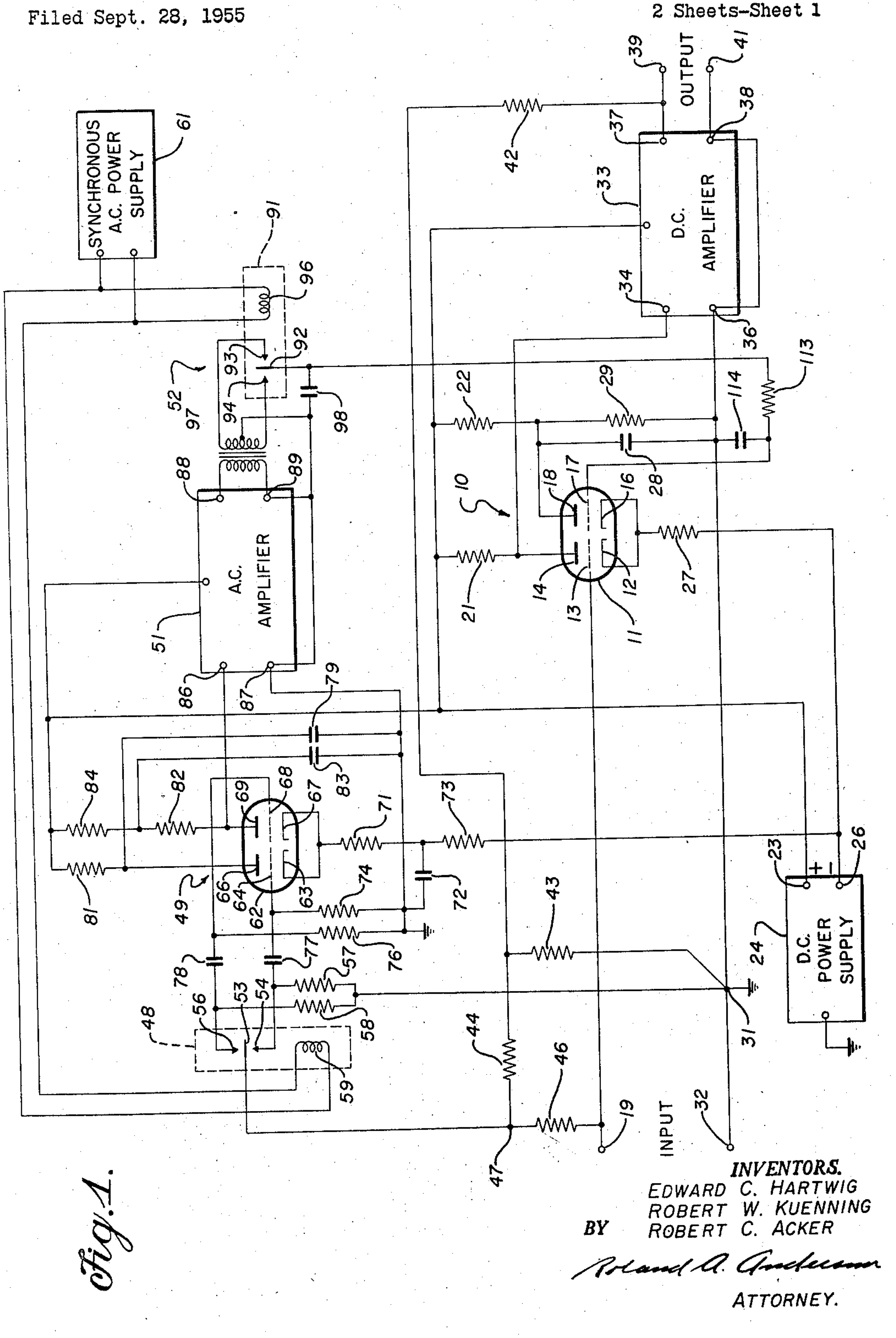
Figure 1 is a schematic wiring diagram of the present invention.

Referring to Fig. 1 of the drawing in detail there is provided a conventional difference amplifier input stage 10 which includes a duo triode vacuum tube 11 having at least first half cathode 12, grid 13 and anode 14, and second half cathode 16, grid 17, and anode 18. A plug connector 19 is connected to the first half grid 13 and the first and second half anodes 14, 18 are respectively connected through suitable plate load resistors 21 and 22 to a positive terminal 23 of a conventional direct current power supply 24. A negative terminal 26 of the power supply 24 is connected through a cathode bias resistor 27 to the first and second half cathodes 12 and 16 which are commonly connected. A plate decoupling network comprising a parallel-connected capacitor 28 and resistor 29 is connected between the second half anode 18 and a single point ground potential datum 31. A ground terminal plug connector 32 is connected to the single point ground 31 to furnish the proper ground reference potential datum to an input signal impressed between the input plug 19 and the ground terminal plug 32. The duo triode 11 is thus connected as a difference amplifier stage 10 to produce an output signal at its first half anode 14 which is proportional to the instantaneous difference between two signals respectively impressed upon the first and second half grids 13, 17.

The output signal from the difference amplifier stage 10 is applied to a conventional direct current amplifier 33 by connecting a signal input terminal 34 of the latter amplifier to the first half anode 14 of the duo triode 11 and a terminal 36 to the single point ground 31. The amplifier 33 is suitably energized by the direct current power supply 24 to provide an amplified signal between two output terminals 37, 38, the latter of which (terminal 38) is connected to the input terminal 36. The output terminals 37, 38 are connected to suitable terminal means which afford convenient connection to any desired apparatus; e. g., plug connectors 39 and 41, respectively.

It will be appreciated that a conventional direct current amplifier introduces various extraneous signals between its input and output terminals. Such extraneous signals result from slow variations in the plate current of the amplifier tubes due to changes in power supply potentials, aging of the tubes, low frequency flutter associated with the inherent characteristics of cathodes, and the like. Furthermore, the resultant substantially direct current variations, which are generally referred to as drift, are amplified in the same manner as a signal applied to the input terminals of the amplifier. Since many direct current amplifier applications necessitate very small input signals, the output signal of an uncompensated amplifier may include a substantially larger component of undesirable drift than signal.

The drift component appearing in the output signal from the direct current amplifier 33 may be readily developed by a negative feedback circuit connected between the output signal terminal 37 of such amplifier and the input signal terminal 19 of the difference amplifier stage 10. Such feedback circuit comprises two feedback resistors 42, 43 connected in electrical series between the terminal 37 and single point ground 31, and two mixing resistors 44, 46 connected in electrical series between the common juncture of the feedback resistors and the input signal terminal 19. The ohmage ratio of the resistor 43 to the resistor 42 is established equal to the reciprocal of total gain between the input signal terminal 19 and output signal terminal 37, while the ohmage of the resistor 44 is equal that of the resistor 46. The voltage drop across the resistor 43 is then substantially the sum of an input signal voltage impressed at the input terminal 19 plus the drift introduced by the difference amplifier stage 10 and direct current amplifier 33 as referred to the datum level of the input signal. Furthermore, the overall phase shift between the terminals 19 and 37 is 180° by appropriate selection of the number and type of stages within the direct current amplifier 33. Consequently, the voltage appearing at a common juncture 47 between the equal bias resistors 44, 46 is proportional to the instantaneous difference between the voltage developed across the feedback resistor 43 and the input signal impressed at the input terminal 19. Such difference voltage is then proportional to the instantaneous drift introduced by the difference amplifier stage 10 and direct current amplifier 33 and will be referred to as drift error voltage in the following description.

For developing and applying to the difference amplifier stage 10 a drift error signal having such amplitude and phase as to balance out the drift introduced by the difference amplifier stage and the direct current amplifier 33, there is provided a drift stabilization feedback loop. Such feedback loop comprises, in general, a vibrating contactor type of modulator or chopper 48 driving a balanced difference amplifier stage 49, and an alternating current amplifier 51 responsive to the output of the amplifier stage 49 and driving a synchronous rectifier 52. A vibrating contactor 53 of the modulator 48 is connected to the juncture 47 and two stationary contacts 54, 56 are connected through two series-connected equal ohmage bias resistors 57, 58 with the junction between such resistors connected to the single point ground 31. An operating solenoid 59 of the modulator 48 is energized by a suitable alternating current power supply 61 whereby the vibrating contactor 53 alternately contacts a different one of the two stationary contacts 54, 56 at a rate equal to the frequency of such power supply, for example, 60 times per second for a commercial 60 C. P. S. power source. The drift error voltage impressed upon the vibrating contactor 53 then alternately develops voltages across the resistor 57 and the resistor 58 which are each essentially 60 C. P. S. pulsed square waves slowly varying in amplitude according to the instantaneous intensity of the drift error signal and phased 180° with respect to each other.

The balanced difference amplifier stage 49 comprises a duo triode 62 having at least first half cathode 63, grid 64 and anode 66 and second half cathode 67, grid 68 and anode 69. The first and second half cathodes 63, 67, respectively, are connected through a common bias resistor 71 to one side of a decoupling capacitor 72, the other side of which is connected to ground, and to a decoupling resistor 73 which is, in turn, electrically joined to the negative terminal 26 of the direct current power supply 24. The first and second half grids 64, 68 are respectively connected through equal ohmage bias resistors 74, 76 to ground and through equal capacitance blocking capacitors 77, 78 to the stationary contacts 54, 56 of the modulator 48. The first half anode 66 is connected through a decoupling capacitor 79 to ground and through a decoupling resistor 81 to the positive terminal 23 of the direct current power supply 24, and the second half anode 69 is connected to one side of a load resistor 82, the other side of which is coupled through a decoupling capacitor 83 to ground and through a decoupling resistor 84 to the positive terminal 23 of the direct current power supply 24.

It is to be noted that the output voltage appearing at the second half anode 69 of the duo triode 62 is proportional to the instantaneous difference between the signals impressed upon the first and second half grids 64, 68 of the duo triode. Each of such grids 64, 68 is energized by a different one of the pulsed square wave voltage outputs of the modulator 48 developed across the resistors 57 and 58. As mentioned above, the two square waves vary in amplitude according to the instantaneous intensity of the drift error signal and are phased by 180°; i. e., a pulse peak of one wave occurs simultaneously with an interval of zero voltage of the other. Consequently, the voltage output from the second half anode 69 is a balanced alternating voltage wave having positive peak amplitudes proportional to the amplitude drift error signal variation of the pulse peaks of one square wave output of the chopper 48 and negative peak amplitudes proportional to the amplitude drift error signal variation of the pulse peaks of the other chopper square wave output. As an example of the foregoing consider that if the chopper output square wave applied to the first half grid 64 has consecutive values of +5, 0, +7, 0, +9, 0 simultaneously while the chopper output square wave applied to the second half grid 68 has time corresponding consecutive values of 0, +6, 0, +8, 0 +10, then the output square wave at the second half anode 69 has values proportional to +5, −6, +7, −8, +9, −10, the absolute values of such amplitudes being directly proportional to the drift error voltage. The balanced difference amplifier stage 49 then provides means for converting two, phased half-wave voltage outputs from the chopper 48 to a single consolidated balanced full-wave voltage.

The balanced full-wave output voltage appearing at the second half anode 69 of the duo triode 62 is coupled to an input signal terminal 86 of the alternating current amplifier 51, a datum input terminal 87 of which is connected to ground. The alternating current amplifier 51 is any suitable type capable of amplifying alternating voltage variations, e. g., several conventional cascaded R-C coupled pentode stages. The amplifier 51 is suitably energized with plate operating potential from the positive terminal 23 of the direct current power supply 24, and such amplifier is provided with two output terminals 88 and 89, the latter one of which is connected to ground, to accommodate coupling to the synchronous rectifier 52.

The synchronous rectifier 52 is any suitable type for synchronously rectifying the output voltage from the alternating current amplifier 51 (substantially an amplified replica of the output voltage from the difference amplifier stage 49) and thereby obtaining a unidirectional voltage which is essentially an amplified replica of the drift error voltage impressed upon the vibrating contactor 53 of the chopper 48. The rectifier 52, as shown on Fig. 1, is a chopper 91 similar to the chopper 48 and includes a vibrating contactor 92, two stationary contacts 93, 94, and an operating solenoid 96. A step-up transformer 97 having the primary winding connected between the output terminals 88 and 89 of the alternating current amplifier 51 and its secondary winding center tapped to ground and connected between the stationary contacts 93, 94 couples the output voltage from the amplifier to the chopper 91. The operating solenoid 96 of the chopper is energized in electrical parallel with the solenoid 59 of the chopper 48 by the power supply 61 thereby driving the vibrating contactor 92 of the chopper 91 in exact synchronism with the vibrating contactor 53 of the chopper 48. The instantaneous output voltage from the transformer 97 causes equal but oppositely phased alternating square waves to be impressed at each of the stationary contacts 93, 94 which are proportional to the output voltage from the alternating current amplifier 51. The voltage at the contact 93 is then alternately positive and negative while the voltage at the contact 94 is simultaneously negative and positive. The vibrating contactor 92 of the chopper 91 being driven in exact synchronism with the contactor 53 of the chopper 48 effecting the square wave input to the alternating current amplifier 51, then alternately contacts the stationary contacts 93, 94 at the instant that each is correspondingly of a like sign thereby rectifying the alternating square wave output of such amplifier. The resultant voltage wave appearing at the vibrating contactor 92 of the chopper 91 is thus essentially an amplified replica of the drift error voltage impressed at the chopper 48, any switching notch effected in such wave being artificially filled in because of the action of a filter capacitor 98 shunted between the contactor 92 and ground.

Figure 2:
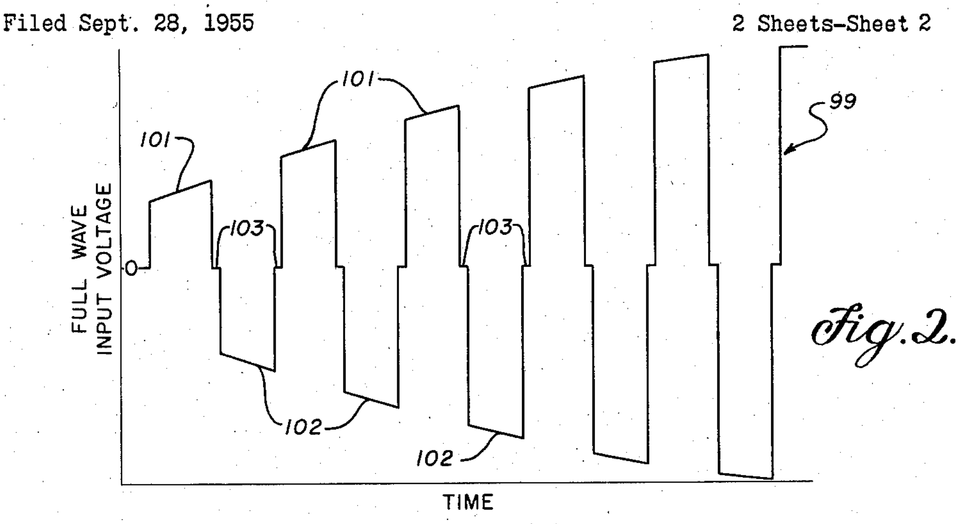
Figure 2 is a graphical illustration of an interrupted drift correction voltage wave as utilized in the circuit of Fig. 1.
Figure 3:
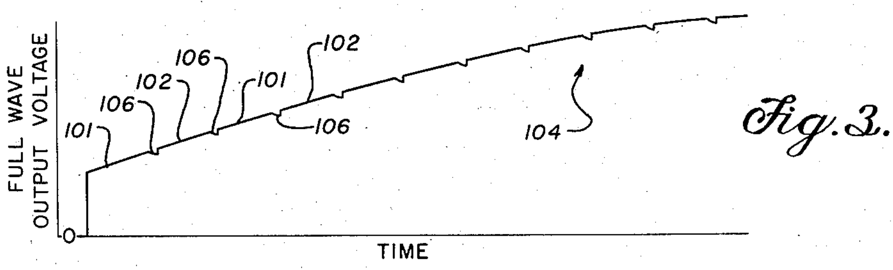
Figure 3 is a graphical illustration of the rectified drift correction voltage output wave provided in the circuit of Fig. 1.
Figure 4:
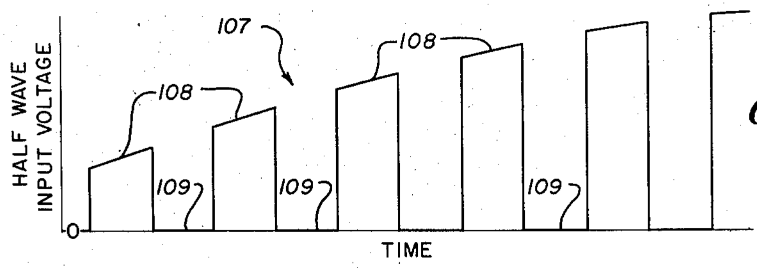
Figure 4 is a graphical illustration of a chopped drift correction voltage wave as applied to the input of a rectifier in a typical half-wave modulator-alternating current amplifier-rectifier system.
Figure 5:
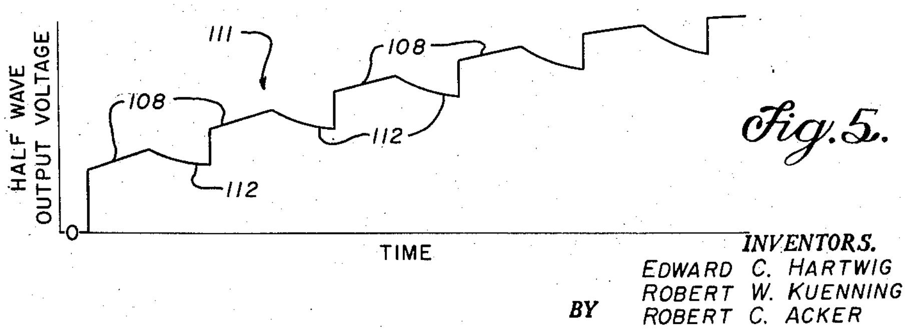
Figure 5 is a graphical illustration of the rectified drift correction voltage output wave from a typical half-wave rectifier system.

Considering now the advantages of the full wave system described above as compared to a conventional half wave system, reference is made to Figs. 2 and 3 which depict wave forms associated with the former system and Figs. 4 and 5 which depict wave forms associated with the latter system. Referring first to Fig. 2, there is shown a balanced alternating voltage square wave 99, of the type appearing at the output terminals 88 and 89 of the alternating current amplifier 51 and applied to the synchronous rectifier chopper 91. It is to be noted that positive amplitudes 101 and negative amplitudes 102 of the wave are both varying according to the instantaneous value of the drift error signal applied to the modulator chopper 48 and that the instantaneous voltage of this wave is positive or negative except for short intervals of zero voltage 103 occurring between each positive and negative alternation of the wave. The intervals of zero voltage occur during excursions or switching time of the vibrating contactor 53 between the stationary contacts 54 and 56 of the chopper 48.

Referring now to Fig. 3, there is shown a rectified voltage wave 104 as is obtained at the output of the synchronous rectifier chopper 91 for an input thereto of the alternating square wave 99 shown in Fig. 2. The positive and negative amplitudes 101 and 102 respectively of the alternating square wave 99 are both oriented in a unilateral manner in the rectified output wave 104, the negative amplitudes 102 being inverted and appearing alternately adjacent to the positive amplitudes 101 in corresponding time sequence. The rectified wave 104 is an amplified replica of the drift error voltage applied to the modulator chopper 48 except for small switching notches 106 existing in the wave which correspond to the intervals of zero voltage 103 in the alternating square wave 99. The switching notches would appear as substantially larger notches having voltage values of zero but for the action of the filter capacitor 98 artificially filling in such large notches.

Considering now Figs. 4 and 5, there is shown a typical half-wave pulsed square wave voltage 107 (shown in Fig. 4) as applied to the input of a synchronous rectifier of a conventional half-wave modulator-alternating current amplifier-rectifier system and derived from a drift error input voltage to such system similar to the drift error input voltage of the full-wave system from which the voltages of Figs. 2 and 3 were derived. It will be noted that the pulsed square wave voltage 107 alternates between positive pulse amplitudes 108, which vary according to the instantaneous value of the drift error voltage, and intervals of zero voltage 109. The wave 107 then contains drift error voltage intelligence only during the time duration of the positive pulses, which is approximately 50% of the time. A corresponding half-wave output voltage wave 111 (shown in Fig. 5) consequently comprises the drift error voltage varying pulse amplitudes 108 alternately adjacent switching notches 112, artificially filled in by capacitor filtering during the intervals of zero voltage 109 in the rectifier input pulsed square wave 107. It may be easily seen by comparing the rectified output voltage wave 111 from a half-wave system to the rectified output voltage wave 104 from a comparable full-wave system that the switching notches 106 occurring therein during the relatively short time intervals of zero voltage 103 are substantially smaller than the notches 112 occurring in the wave 111 from a half-wave system during the relatively long time intervals of zero voltage 109. The notch content of the rectified output drift error voltage wave from the full-wave rectifier chopper 91 is consequently substantially smaller than that of an output voltage wave from a related half-wave system.

To further reduce the ripple produced by the chopper 91 a filter comprising a series resistor 113, one side of which is connected to the vibrating contactor 92 of the chopper 91 and the other side of which is connected through a shunt capacitor 114 to ground, is provided. The voltage appearing at the juncture of the resistor 113 and capacitor 114 is then essentially free from ripple and contains negligible noise and hum and such juncture is connected to the second half grid 17 of the difference amplifier input stage 11. The amplified drift error signal is thus impressed upon the grid 17 without the simultaneous introduction of extraneous noise and hum resulting from the elements of the feedback loop.

With the foregoing connections accomplished and the circuit suitably energized, the difference amplifier input stage 11 and the direct current amplifier 33 will amplify any signal appearing across the input terminals 19, 32. Such amplified signal is then impressed across the output terminals 39, 41 and readily available for use with any desired externally connected apparatus.

With respect to the operation of the drift stabilization circuit, it is to be noted that in the case of an ideal input stage 11 and ideal direct current amplifier 33, the voltage developed across the feedback resistor 43 being equal to the output voltage appearing across the output terminals 39, 41 divided by the overall gain of such input stage and amplifier is equal but opposite to any signal impressed across the input terminals 19, 32. Consequently, the drift error voltage developed at the juncture 47 is zero.

It is readily apparent that two conditions may exist for actual amplifiers which are departures from the foregoing case of ideal amplifiers wherein no drift voltages are developed, firstly when the drift voltage inherently introduced by the input stage 11 and direct current amplifier 33 is additive to the signal voltage at the output terminals 39 and 41, and secondly when such drift voltage is subtractive from the signal voltage at the output terminals 39 and 41. The former condition results in a positive drift error voltage at the juncture 47 and the latter condition results in a negative drift error voltage at the juncture.

With regard to the action of the drift stabilization circuit under the condition of a positive drift error voltage existing at the juncture 47, it is to be noted that an amplified positive replica of such voltage is impressed at the second input grid 17 of the difference amplifier input stage 10 due to the action of the drift stabilization feedback loop including the full-wave modulator-alternating current amplifier-rectifier system. The amplification of such impressed drift error voltage is appropriately set, by adjusting the gain of the alternating current amplifier 51, whereby such error voltage functions to vary the voltage drop of the common cathode resistor 27 and the potential of the first and second half cathodes 12, 16 of the difference amplifier stage 10 in such a way that a direct current signal to be amplified and impressed upon the first input grid 13, is reduced by an amount offsetting the additive drift component existing in the output signal appearing across the output terminals 37, 38.

Similarly, with the drift voltage subtractive from the signal output voltage at the terminals 39, 41 and a negative drift error voltage existing at the juncture 47, a negative error voltage is impressed upon the second input grid 17 of the difference amplifier stage 10 in the same manner as described above. Such negative error voltage functions to vary the voltage drop of the common cathode resistor 27 and the potential of the cathodes 12, 16 of the difference amplifier stage 10 so as to increase a direct current signal to be amplified impressed upon the first input grid 13 by an amount offsetting the subtractive effect of the drift component in the output signal existing at the output terminals 39, 41.

It will be apparent to those skilled in the electronics art that the drift stabilization time of the instant amplifier (i. e., the interval of time occurring from the instant a particular value of drift voltage is initiated within the amplifier and the instant a corresponding value of drift error voltage functions to offset such value of drift voltage) is relatively short. As was hereinbefore noted, the noise and hum content of the output drift error voltage wave from the rectifier chopper 91 of the present invention is relatively small compared to that of related existing equipment and therefore the degree of filtering necessary to reduce the noise and hum content to a negligible level prior to applying the drift error voltage wave to the difference amplifier input stage 11 is also relatively low. The size of the components of the required noise and hum filter( i. e., the filter capacitors 93 and 114 and resistor 113 of the embodiment of the invention herein described) is then quite small and, consequently, the time constant thereof relatively short. The required noise and hum filter then delays the drift error voltage from being applied to the difference amplifier input stage 10 by a relatively negligible amount and the drift stabilization time of the present invention is consequently very short. Drift is therefore very nearly exactly balanced out.

From the foregoing it is apparent that any variation occurring within the instant direct current amplification device which is not due to an input signal impressed across the input terminals thereof will be automatically and continuously compensated to provide a high fidelity output signal across the output terminals 39, 41 of the circuit. It has been found that the present invention, constructed with conventional elements, compensates drift voltages to within limits of ±0.000006 volt while limiting combined noise, hum, hash, and the like to 0.00001 volt.

While the invention has been disclosed with respect to a single preferred embodiment, it will be apparent to those skilled in the art that numerous variations and modifications may be made within the spirit and scope of the invention, and thus it is not intended to limit the invention except as defined in the following claims.

What is claimed is:

1. In an improved circuit for continuously and automatically stabilizing a D. C. amplifier of the type having a first input circuit connected to a source of signals to be amplified, a second input circuit, an output circuit, and inverse feedback means coupling said output circuit to said first input circuit, the combination comprising an electronically driven chopper having a pair of fixed contacts and a movable contact adapted to contact said fixed contacts alternately, said movable contact being connected to said first input circuit, differencing means coupled between said fixed contacts to develop an A. C. voltage indicative of the instantaneous alegbraic difference between the voltages at each of said fixed contacts, an A. C. amplifier connected to said differencing means to amplify said A. C. voltage, means connected between the output of said A. C. amplifier and said second input circuit for synchronously rectifying the output of said A. C. amplifier and applying to said second input circuit a D. C. stabilizing voltage.

2. A device for amplifying direct current signals with a high degree of fidelity comprising a first duo-triode vacuum tube having at least first and second cathode, grid, and anode elements, said cathodes commonly connected through a resistor to a source of said grid bias potential, said anodes coupled to a source of plate bias potential, an output circuit, direct curent coupled amplifying means coupling an anode of said first duo-triode to said output circuit, means connecting a source of signals to be amplified to said first grid, an inverse feedback network connecting said output circuit and said first grid, an electronically driven chopper having a pair of fixed contacts and a movable contact adapted to contact said fixed contacts alternately, said movable contact connected to said first grid, a second duo-triode vacuum tube having at least first and second cathode, grid, and anode elements, said first and second cathodes commonly connected through a resistor to said source of grid bias potential, said first and second anodes coupled to said source of plate bias potential, said first and second grids respectively coupled each to a different one of said pair of fixed contacts, an A. C. amplifier coupled to an anode of said second duo-triode, a second electronically driven chopper having a pair of fixed contacts and a movable contact adapted to contact said fixed contacts alternately, a transformer having a primary winding connected across the output of said A. C. amplifier and a secondary winding including a grounded center-tap connected across the fixed contacts of said second chopper, a resistor connected between the movable contact of said second chopper and said second grid of said first duo-triode, a capacitor shunted between the movable contact of said second chopper and ground, a second capacitor shunted between said second grid of said first duo-triode and ground, and means driving the movable contacts of said first and second choppers in synchronism.

3. In an improved circuit for continuously and automatically stabilizing a D. C. amplifier of the type having a first input circuit connected to a source of signals to be amplified, a second input circuit, and an output circuit, the combination comprising inverse feedback means coupling said output circuit to said input circuit, an electronically driven chopper having a pair of fixed contacts and a movable contact adapted to contact said fixed contacts alternately, said movable contact connected to said first input circuit, a difference amplifier section including a duo triode vacuum tube having at least first and second cathode, grid, and anode elements, said first and second cathodes commonly connected through a resistor to a source of grid bias potential, said first and second grids respectively coupled each to a different one of said pair of fixed contacts, said anodes coupled to a source of plate bias potential, an A. C. amplifier coupled to one of said anodes, a second electronically driven chopper having a pair of fixed contacts and a movable contact adapted to contact said fixed contacts alternately, a transformer having a primary winding connected across the output of said A. C. amplifier and a secondary winding including a grounded center-tap connected across said pair of fixed contacts of said second chopper, means driving the movable contact of said second chopper in synchronism with the movable contact of said first chopper, and means including a filter connecting the movable contact of said second chopper to said second input circuit and applying thereto a D. C. stabilizing voltage such that the input and the output voltages of said D. C. amplifier are zero at the same time.

References Cited in the file of this patent

UNITED STATES PATENTS

| | | |
|---|---|---|
| 2,619,552 | Kerns | Nov. 25, 1952 |
| 2,685,000 | Vance | July 27, 1954 |
| 2,714,136 | Greenwood | July 26, 1955 |
| 2,730,573 | Sedgfield et al. | Jan. 10, 1956 |

FOREIGN PATENTS

| | | |
|---|---|---|
| 620,140 | Great Britain | Mar. 21, 1949 |